Oct. 27, 1931.                W. M. HEINA                1,829,219
                        PORTABLE RADIO APPARATUS
                          Filed Jan. 15, 1929
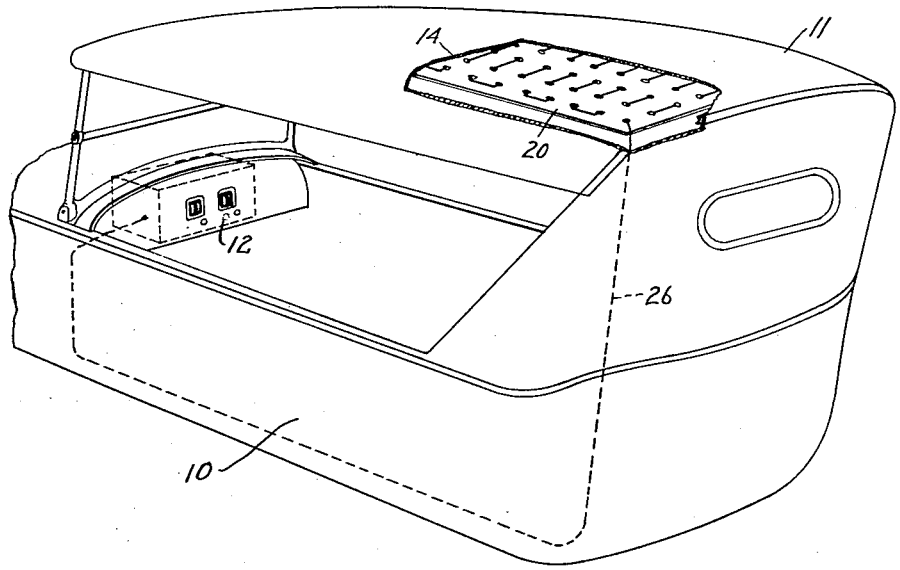
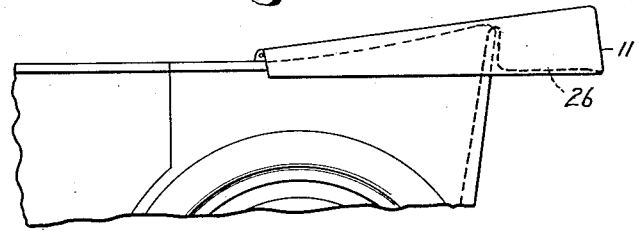
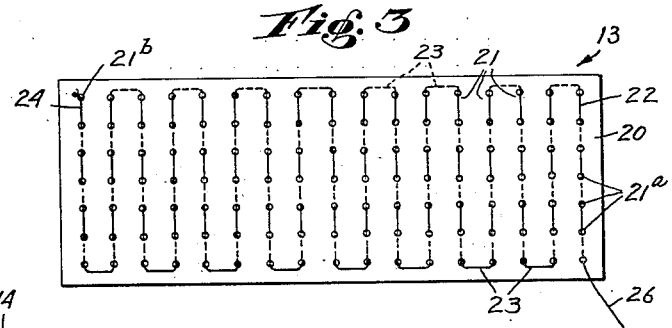
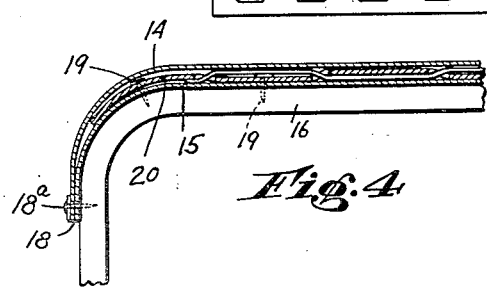
INVENTOR.
William M. Heina
BY
ATTORNEYS.

Patented Oct. 27, 1931

1,829,219

UNITED STATES PATENT OFFICE

WILLIAM M. HEINA, OF LONG ISLAND CITY, NEW YORK, ASSIGNOR, BY MESNE ASSIGNMENTS, TO TRANSITONE AUTOMOBILE RADIO CORPORATION, OF PHILADELPHIA, PENNSYLVANIA, A CORPORATION OF DELAWARE

PORTABLE RADIO APPARATUS

Application filed January 15, 1929. Serial No. 332,620.

This invention relates to portable radio apparatus.

An object of this invention is to provide an antenna for a radio receiving set installed on a motor vehicle and which shall be particularly adapted for use with an automobile having a collapsible top.

A further object of this invention is to provide an antenna of the character described which shall be so constructed and built into the flexible top of an automobile as to permit free movements of said top without interference from and without injury to said antenna.

A further object of this invention is to provide an effective antenna of the character described which shall be rugged in construction, inexpensive to manufacture and install, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a perspective view of a car having a collapsible top provided with an antenna embodying the invention;

Fig. 2 is a fragmentary side view of the car shown in Fig. 1 with the top in collapsed and folded position;

Fig. 3 is a plan view of the antenna and its support removed from the automobile top; and Fig. 4 is an elevational cross-sectional view of the automobile top shown in Fig. 1.

Referring in detail to the drawings, 10 designates a vehicle here shown as a passenger automobile of the open type, such as a roadster or touring car, having a folding or collapsible top 11. Said vehicle 10 is provided with a radio receiving set 12 mounted on the dashboard of said vehicle in a manner, for example, more particularly described in my Patent 1,626,464 issued April 26th, 1928. Said set is connected to an antenna 13 built into the top 11 of said vehicle in accordance with the present invention in the manner hereinafter described.

The automobile top 11 as usually constructed comprises an outer cover 14 and an inner cloth 15 supported by one or more spaced bows 16 and secured thereto at their meeting edge portion 18 as by fastening means 18a. Interposed between said inner and outer sheets 14, 15, and secured to said bows 16, as at 19, is a sheet 20 of felt, canvas, cloth or any other flexible sheet material. Said sheet 20 may cover substantially the greater portion of the top 11 when the latter is set up. Any securing means 19 may be used for stretching said sheet 20 to keep the same tight when the cover is in set up position.

Said sheet 20 is provided with a plurality of substantially parallel rows 21 of aligned openings 21a, said rows being disposed transversely to the longitudinal axis of the vehicle. As shown in Fig. 3 each row has a predetermined number of openings 21a and the rows 21 are spaced from one another substantially the distance between the openings in each row. Any suitable number of rows of openings may be provided and the number of openings in each row may of course, be varied. Preferably, however, each row 21 is made with the same number of equally spaced openings 21a. Alternately threaded thru said openings 21a, is the antenna wire 22. As clearly shown in Figs. 1 and 3, said wire is continuous and is threaded down thru one opening 21a and up thru the next adjacent opening 21a in the same row, and so on thru successive openings until the end of the row where said wire is bent at substantially right angles, as at 23, the wire then being returned in the same manner, thru the openings of the next adjacent row. The end portion 24 of the wire is knotted or otherwise secured at the last hole 21b thru which it extends. The antenna wire is preferably insulated by the usual rubber coating or in any other suitable manner. It now becomes apparent that the automobile top 11 may be lowered to its collapsed or folded position, as in Fig. 2, or raised to its position, as in Fig. 1, without interference from the antenna, the latter merely folding with said top. It also becomes apparent that due to the manner of mounting the antenna wire in parallel rows transverse to the longitudinal axis of the car, or substantially parallel to the folds of the automobile top, the antenna 13 is insured against injury from the movements of the automobile top into collapsed or raised positions, and at the same time, an aerial of considerable length is produced, making possible radio reception over a wide range in a short-length automobile top.

A conductor wire 26 may connect the antenna wire 22, to the radio receiving set 12. Said wire 26 is preferably insulated by rubber tubing or the like to prevent chafing of the same and is built into the vehicle body in any suitable manner.

The flexible sheet 20 and the antenna wire 22 may be built into collapsible or other vehicle tops now in use. Where a top is provided with only one cover sheet 14 instead of two as shown in Fig. 4, the additional sheet or cloth 15 may be provided for covering the antenna.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings, is to be interpreted as illustrative and not in a limiting sense.

Having thus described my invention, I claim as new and desire to secure by Letters Patent:

1. In combination with the collapsible top of a vehicle, a radio antenna comprising a wire carried by said top and arranged to form a plurality of spaced lengths substantially parallel to the folds of said top, said lengths being connected by relatively shorter lengths extending substantially longitudinally of the top.

2. In combination with the collapsible top of a vehicle, a radio antenna structure carried by said top comprising a sheet of flexible material having a plurality of openings arranged in rows substantially parallel to the folds of said top, and a wire threaded through said openings in said sheet and transversely of said top.

3. In combination with the collapsible top of a vehicle, a radio antenna comprising a wire carried by said top and arranged to form a plurality of spaced lengths extending back and forth in succession and transversely of said top.

In testimony whereof I affix my signature.

WILLIAM M. HEINA.